United States Patent [19]

Boyse

[11] Patent Number: 4,585,381
[45] Date of Patent: Apr. 29, 1986

[54] VOID FILLER

[75] Inventor: George C. Boyse, Rocklin, Calif.

[73] Assignee: Down River International, Inc., Sacramento, Calif.

[21] Appl. No.: 539,621

[22] Filed: Oct. 6, 1983

[51] Int. Cl.$^4$ .................. B61D 45/00; B32B 3/12
[52] U.S. Cl. .................................. 410/154; 428/116; 52/807; 206/814
[58] Field of Search .............. 206/593, 594, 521, 516; 410/154, 155; 156/197; 428/116, 118, 73

[56] References Cited

U.S. PATENT DOCUMENTS

| | | | |
|---|---|---|---|
| 2,274,765 | 3/1942 | Zalkind | 428/133 |
| 2,674,295 | 4/1954 | Steele et al. | 154/1 |
| 2,848,132 | 8/1958 | Davous | 217/23 |
| 3,227,599 | 1/1966 | Holland | 428/118 |
| 3,342,666 | 9/1967 | Hull | 428/184 |
| 3,593,671 | 7/1971 | Bramlett | 105/396 B |
| 3,687,767 | 8/1972 | Reisman et al. | 156/211 |
| 4,007,309 | 2/1977 | Sewell | 428/116 |
| 4,247,237 | 1/1981 | Brown | 410/154 |
| 4,372,717 | 2/1983 | Sewell et al. | 410/154 |
| 4,386,881 | 6/1983 | Liebel | 410/154 |
| 4,516,891 | 5/1985 | Unuc et al. | 410/154 |

FOREIGN PATENT DOCUMENTS 878255 8/1971 Canada .................. 314/105

Primary Examiner—David A. Scherbel
Assistant Examiner—Glenn B. Foster
Attorney, Agent, or Firm—Harness, Dickey & Pierce

[57] ABSTRACT

An expansible honeycomb-type void filler formed of stacked strips secured together at spaced and staggered positions to define cell walls which vary in length to provide vertically aligned shortened stretch-limiting walls which reduce hourglass-type distortion, has suspension means consisting of a supporting top strip of the stack and a suspension structural element, said suspension means also including parts movable in a direction lengthwise of the strips to provide openable cells between the suspension structural element and the supporting top strip of the stack. The void filler is also disclosed as having widened adhesive connections in an upper region, and as being formed of corrugated paperboard which is partially crushed.

21 Claims, 30 Drawing Figures

Glue Position Spacing, Inches, Center To Center

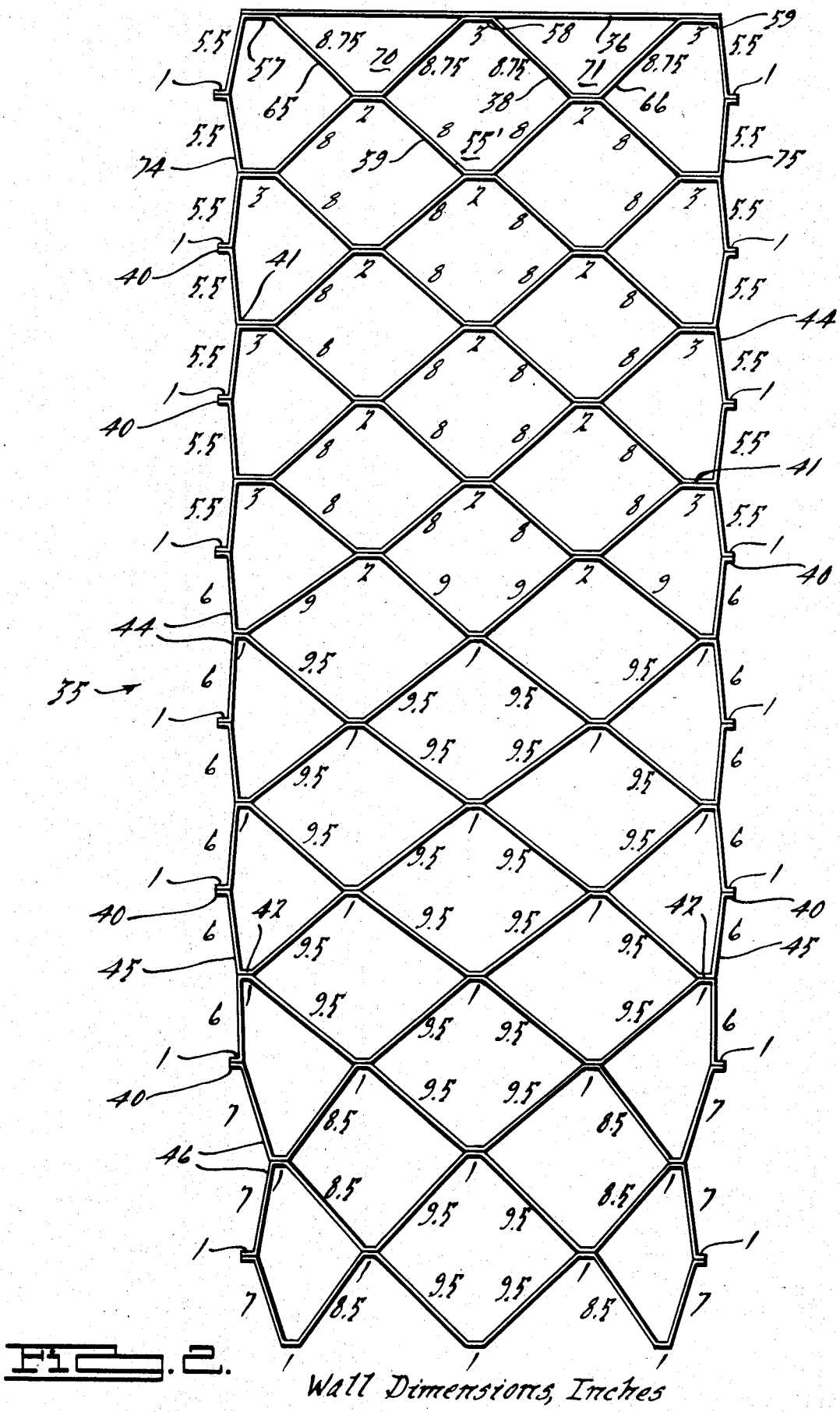
FIG. 2. Wall Dimensions, Inches

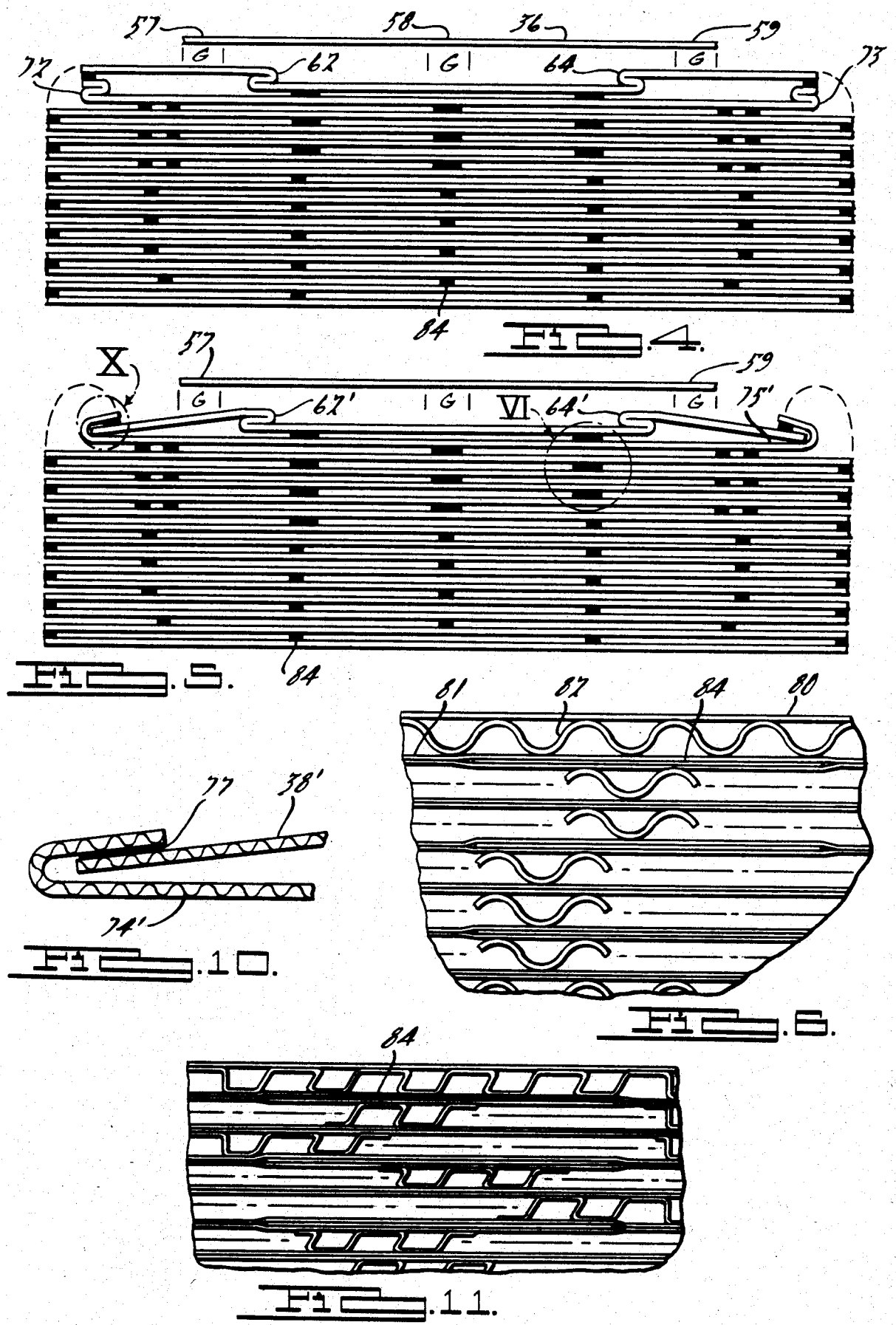

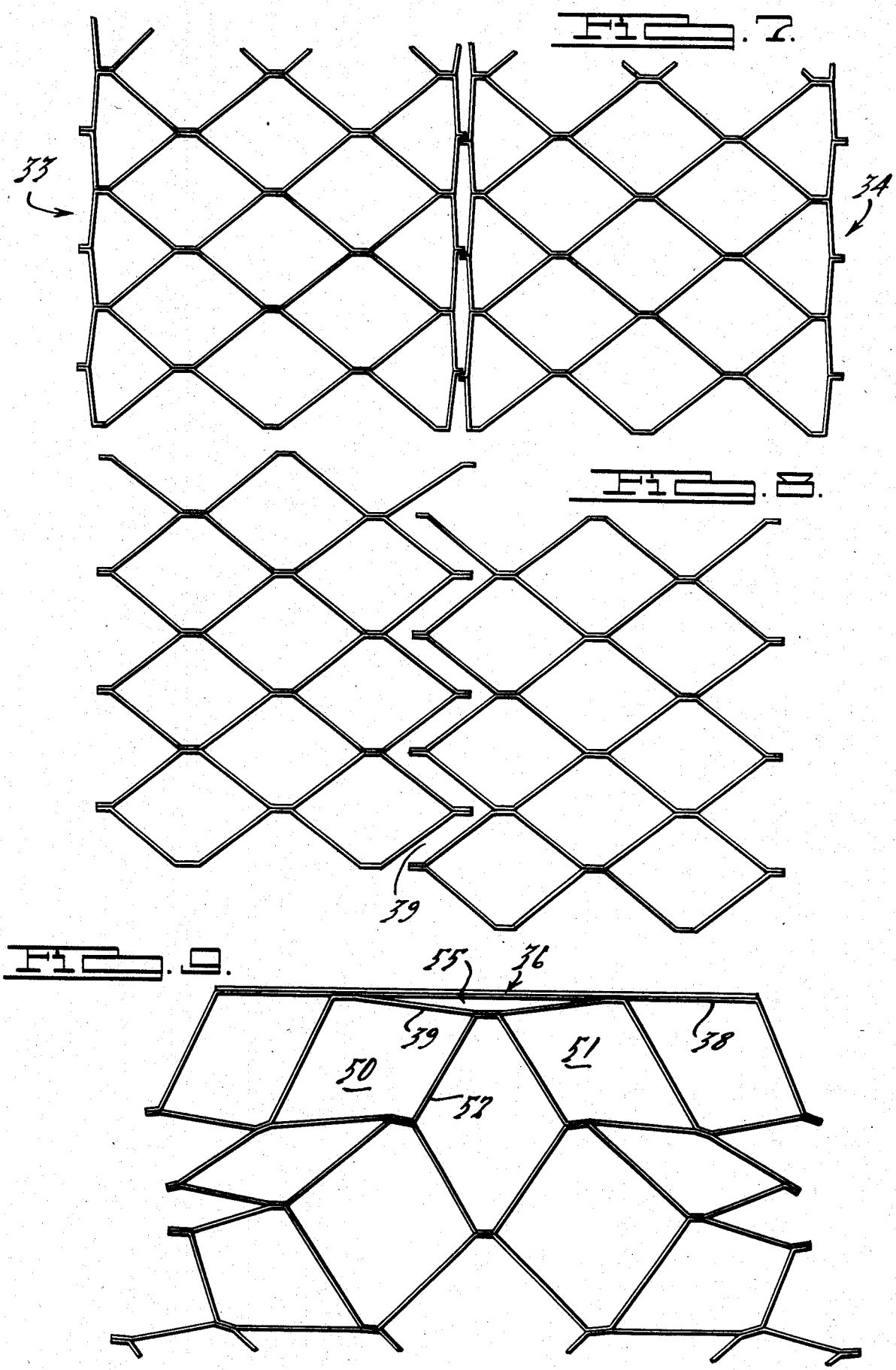

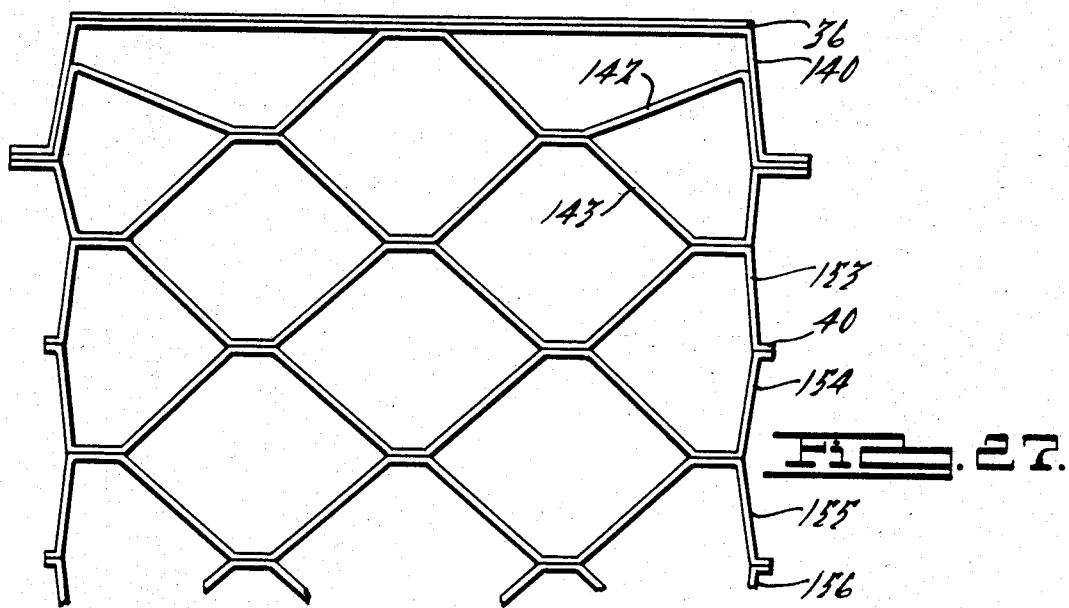
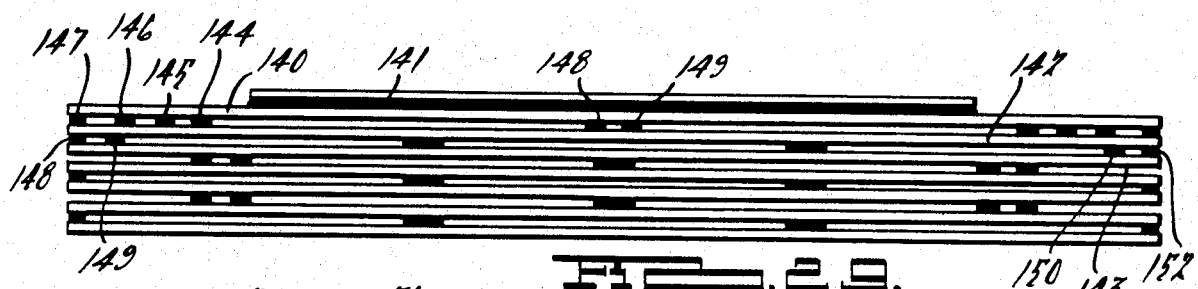
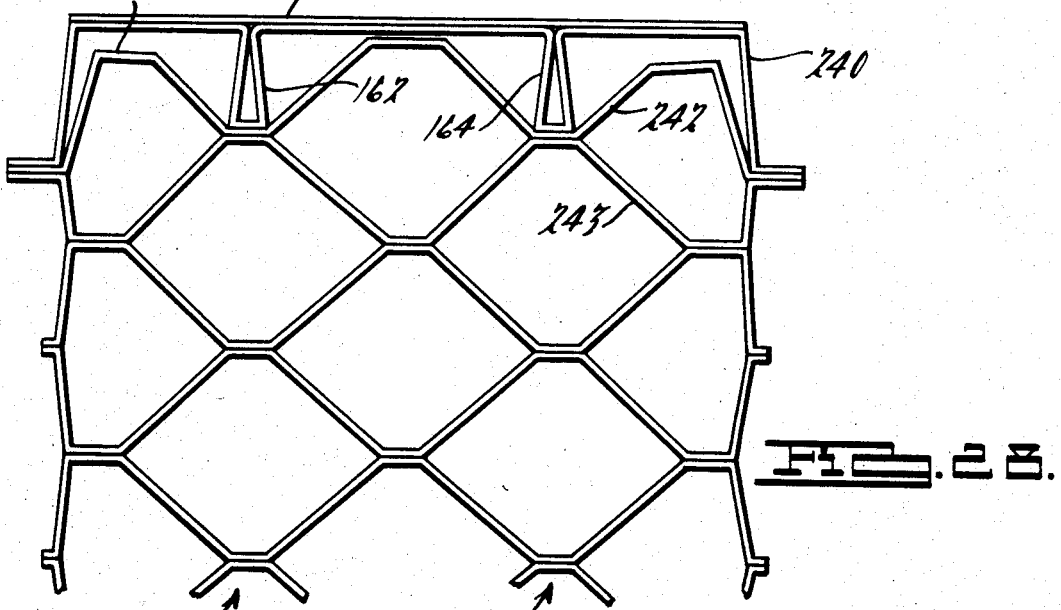
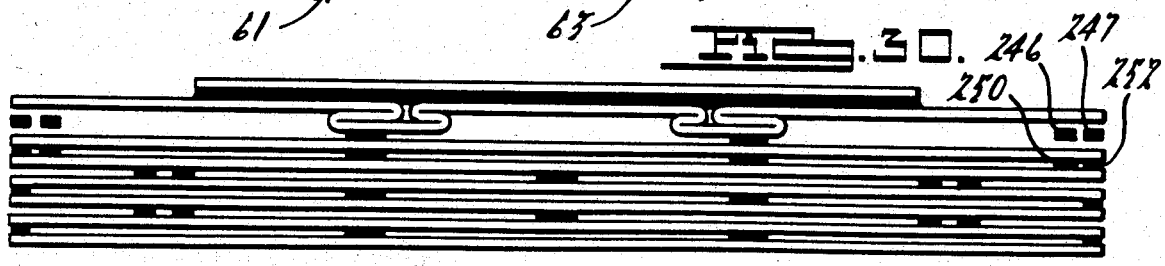

VOID FILLER

BACKGROUND OF THE INVENTION

Expansible honeycomb-type void fillers made of a lightweight fibrous stock such as corrugated paperboard have found wide acceptance because they provide effective protection of cargo at low overall cost thereby benefitting the ultimate consumer as well as all merchandising, shipping and handling operations, back to and including the manufacturer.

In order to effectively fill void areas in cargo vehicles it is generally desirable that honeycomb-type fillers, when expanded, assume a shape as nearly rectangular as possible. A problem which has long been recognized in this connection derives from the fact that when honeycomb fillers are expanded beyond a predetermined length, the mid-portions of the sides tend to pull inwardly, imparting a waist-like or hourglass configuration to the expanded filler and creating unprotected areas. Overstretching by the workman who installs the filler in the truck, rail car or other carrier, or overstretching which occurs during use due to vibration and the effect of gravity has in the past, by causing such hourglass-type distortion, been the cause of cargo damage due to shifting and/or falling of unprotected portions of the cargo. Considerable effort has been devoted to overcoming the hourglass distortion problem. See for example Bramlett U.S. Pat. No. 3,593,671, Sewell U.S. Pat. No. 4,007,309, Sewell et al, U.S. Pat. No. 4,372,717, and the co-pending U.S. patent application of Paul A. Wnuk et al, Ser. No. 393,662, filed June 30, 1982, belonging to the owner of the present application.

Although the inventions disclosed in such previous patents and patent application reduce the tendency to hourglass distortion, some of such prior art solutions require introducing complication in the form of parts which add to the direct cost of the fillers, while all of such prior art stretch limiting techniques result in reducing the expanded length of the filler thereby making it necessary to provide additional filler material at the bottom, in order to achieve a properly rectangular configuration which will effectively fill the void space.

An important object of the present invention, therefore, is to provide an improved void filler of the honeycomb type incorporating means for increasing the effective expanded length of the filler without increasing the tendency toward hourglass distortion. A related object is to provide improved suspension means for supporting the filler in depending relation to the suspension means.

Another object of the invention is to provide a honeycomb-type filler made of corrugated paperboard having improved folding characteristics which promote ease and speed of installation.

Still another object of the invention is to provide an improved void filler of the honeycomb-type which incorporates side cell wall portions which have the dual function of resisting hourglass distortion and of preventing the fillers, when used side-by-side, from interfitting and reducing the effective protected space in the lateral dimension.

Other objects and advantages of the invention will become apparent upon consideration of the present disclosure in its entirety.

BRIEF DESCRIPTION OF THE FIGURES OF DRAWING

FIG. 2 is a front elevational view of a void filler unit incorporating the principles of the present invention, showing the same expanded;

FIG. 4 is a somewhat diagrammatic front elevational view of the filler unit of FIG. 2 in the collapsed condition, the suspension means being shown prior to attachment;

FIG. 5 is a view similar to FIG. 4 showing a somewhat modified construction;

FIG. 6 is an enlarged fragmentary detailed view of the portion within the oval designated by the Roman numeral "VI" in FIG. 5;

FIG. 7 is a fragmentary front elevational view showing portions of two filler units similar to the unit illustrated in FIG. 2 as used side-by-side;

FIG. 8 is a view similar to FIG. 7 showing two similar side-by-side filler portions of a prior art type, illustrating the manner in which, by undesirable interfitting, the effective protected area is reduced as compared to units incorporating the present invention;

FIG. 9 is a fragmentary front elevational view of the upper portion of a filler unit provided with suspension means constructed in accordance with a prior art practice;

FIG. 10 is a fragmentary enlarged view of a front edge portion corresponding to the part within the circle designated X in FIG. 5;

FIG. 11 is a view similar to FIG. 6 showing the same after the performance of a compression step which is used in the manufacture of one form of the invention;

Figure 19:
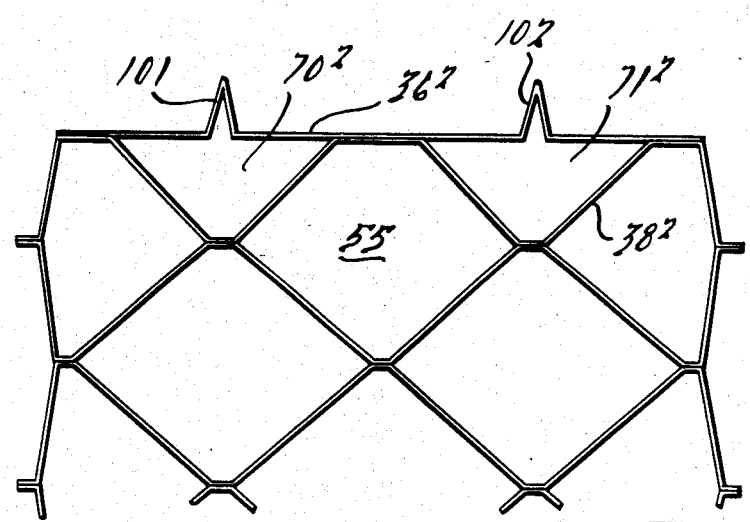
FIG. 19 is a view corresponding to FIG. 18, showing the same fully expanded.
Figure 24:
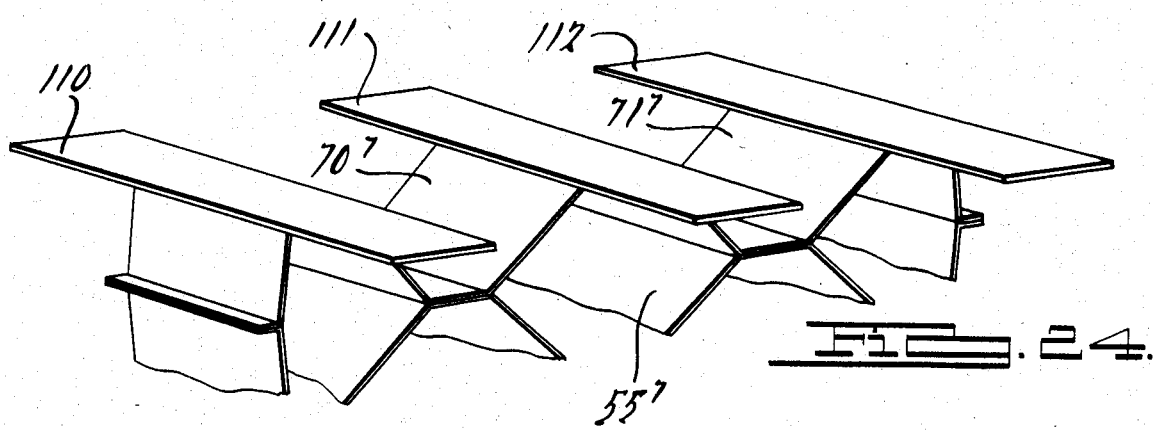
Figure 25:
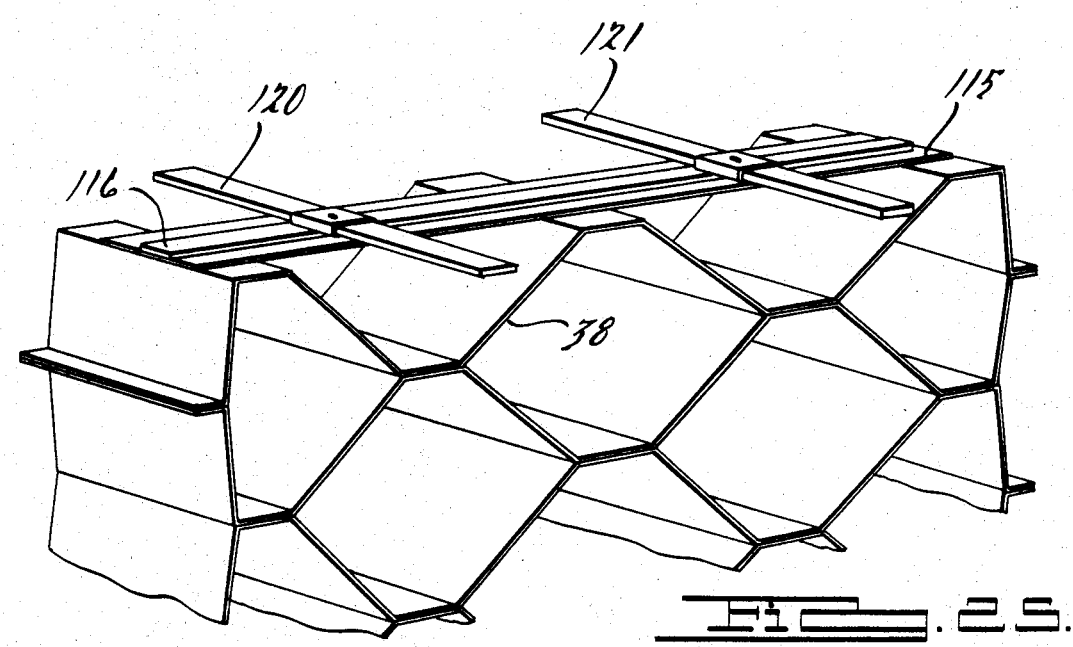
Figure 26:
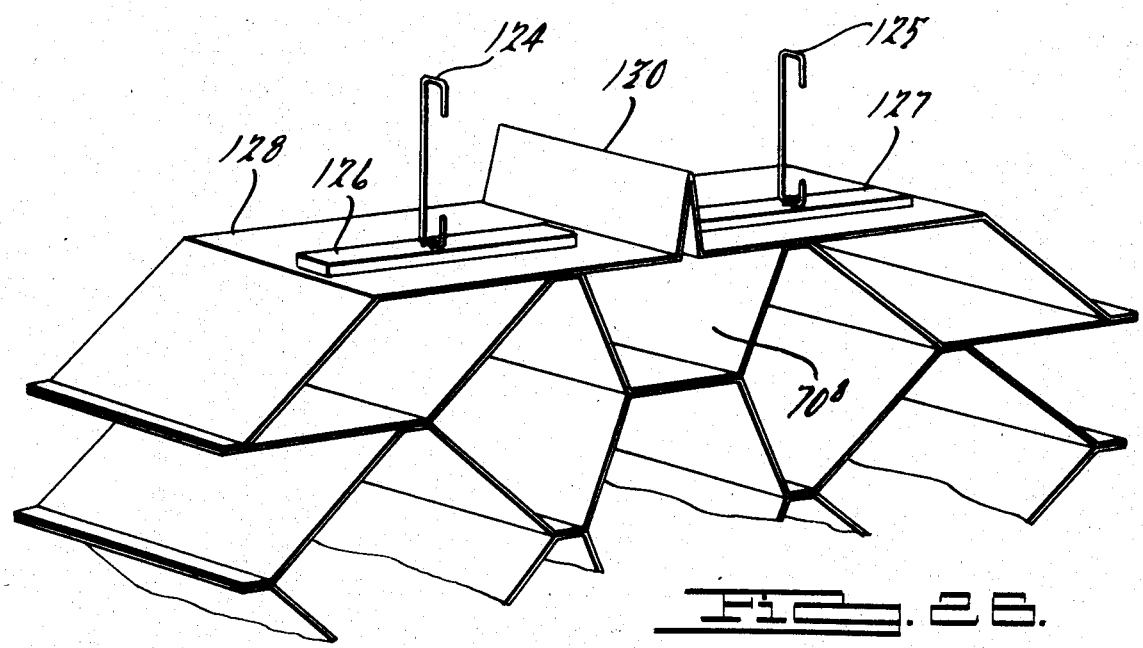

FIGS. 20 to 23 inclusive are views similar to FIG. 19 showing improved hanger means constructed in accordance with the present invention applied to filler units having different cell configurations;

FIGS. 24, 25 and 26 are fragmentary isometric perspective views of the upper portions of expanded filler units showing further modification of my improved suspension means, and FIGS. 27 and 28 are front elevational views of the upper portions of void fillers having suspension means of further modified constructions, and FIGS. 29 and 30 are diagrammatic views similar to FIGS. 4 and 5, showing the collapsed relationship of the plies of the embodiments of FIGS. 27 and 28, respectively.

DETAILED DESCRIPTION OF PREFERRED FORM OF THE INVENTION

Figure 1:
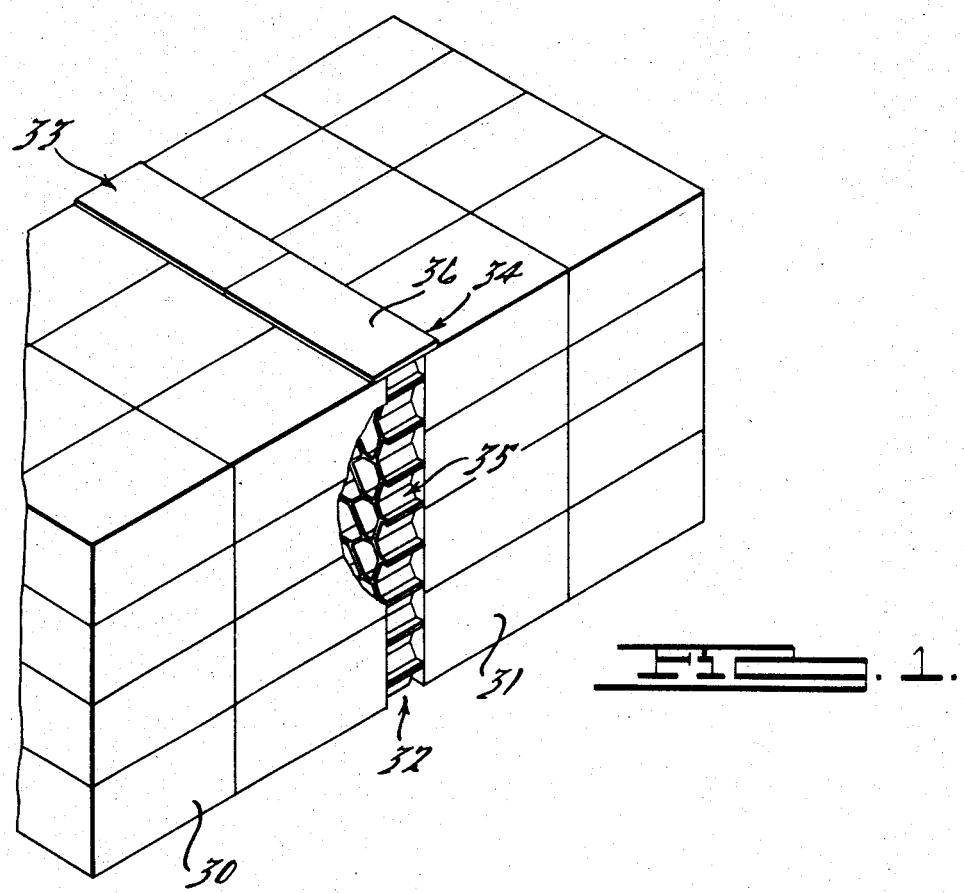
FIG. 1 is an isometric perspective view, partly broken away, illustrating a typical use of the present invention, depicting two filler units in place between boxed cargo.

Referring now in FIG. 1, which illustrates typical cargo, shown as two groups, 30 and 31 of boxed cargo, stacked as it might be when positioned in a freight conveyance such as a railcar, truck or trailer. The boxes 30 are shown as spaced from the boxes 31 by the void area designated 32, as might be the case, for example, if the two groups of boxes, when placed against opposite walls of the carrier, failed to fill the conveyance. In order to occupy the full width of the space 32, two fillers are shown therein, generally designated 33 and 34. Each filler consists of an expanded honeycomb slab, generally designated 35, which is suspended from a suspension structure consisting of a relatively stiff top hanger panel 36, which is typically of corrugated paper stock with the corrugations extending transversely of the space 32, to bridge the same, and by a supporting strip 38 (FIG. 2) secured to the panel 36. Strip 38 comprises the top strip of the honeycomb slab or stack 35.

It will be recognized that the size of the filler units, the number of strips employed, the character and strength of the material used, and other such engineering details may vary widely in accordance with required conditions of use. For purposes of illustration a construction is illustrated in FIGS. 2-4 inclusive consisting of sixteen strips of corrugated paperboard which are stacked and glued together in the manner best disclosed in FIG. 3.

Figure 3:
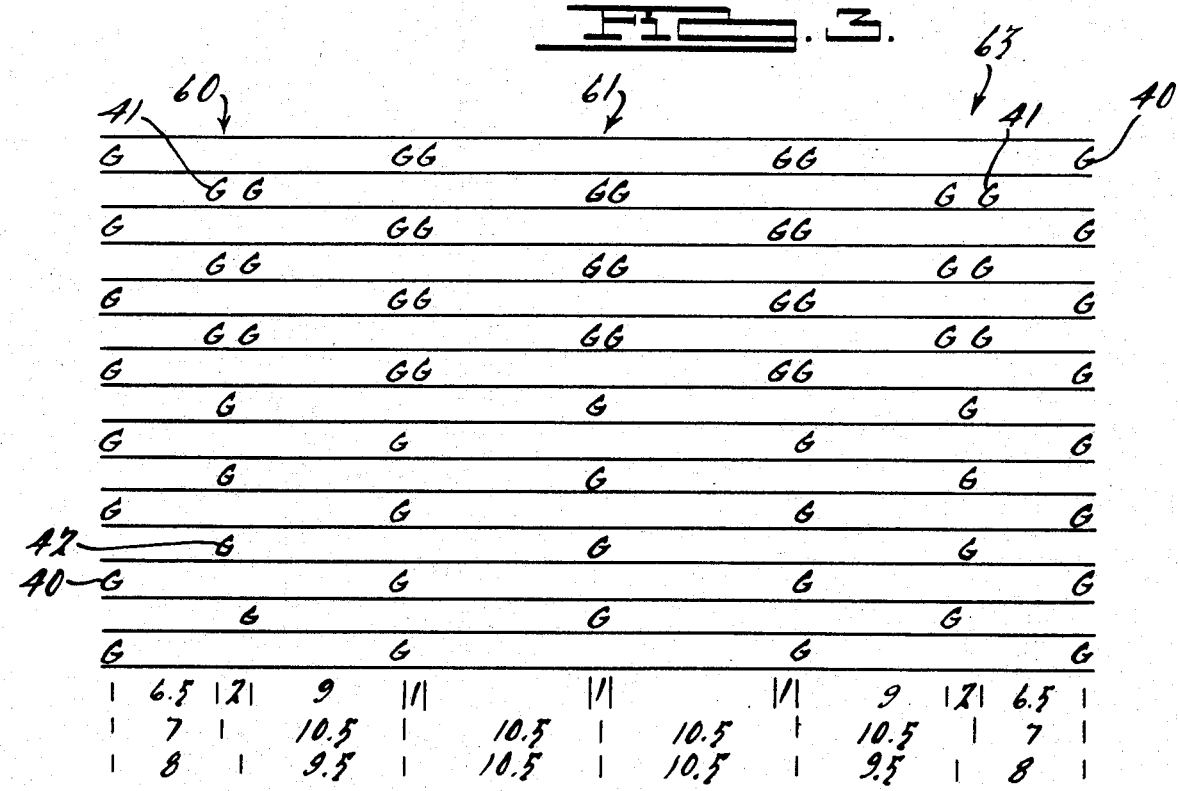
FIG. 3 is a gluing pattern diagram showing the method of securing together the constituent strips of the filler shown in FIG. 2.

In FIG. 3, the dimensions at the bottom show, in inches, the distances between the centers of the glued positions in such a filler of a typical size. The glued positions are of course glue lines, which run transversely of the strips, but the "spotting" or positioning of such glue lines is considered herein from the standpoint of their location and their dimension lengthwise of the strips, since such locations and dimensions control the configuration of the cells and of the stack. The strips are glued together in pairs at their ends, as indicated at 40, and as indicated also by the two outermost vertical rows of the letters G in FIG. 3. The glued positions of the upper nine strips which are spaced inwardly from such outer rows are wider than the glued connections in the outer rows, and also wider than those between the lower eight strips, so that all of the cells bounded by the nine upper strips are somewhat smaller than the lower cells, thereby providing increased strength in the upper areas. Strength is also increased by the wider glued areas.

The distance between the glued positions 40 of the outer rows and the glued positions closest thereto is less than the distances between all of the internal glued positions. Referring to FIGS. 2 and 3, the distance between the end glued positions 40 of the upper seven strips and the next innermost glued position, designated 41, is 6.5", thereby defining shortened, stretch-limiting unglued diagonal cell wall portions 44 which are 5.5" long. The length of the other diagonal cell walls of the upper seven strips is determined by the distance between the inner glued positions, and is shown as eight inches. The distance between the end glued positions 40 of the six next lower strips and the closest inner glued positions, 42, is seven inches. The corresponding spacing of the two outermost glued positions of the bottom three strips is eight inches, both to improve the opening effect and because less strength is required.

Because of the shortened length (5.5" in the representative unit illustrated) of the outer unglued side wall portions 44 formed by the end portions of the upper seven strips and the similar shortened six inch outer side walls 45 formed by the end portions of the next six subjacent strips, and the similar 7" walls 46 of the bottom three strips, such walls, which are shorter than all of the internal diagonal walls, tend to stretch out to relatively straight lines, while the free diagonal walls of the other cells remain at substantial angles to the vertical and provide more nearly hexagonal cells.

In FIG. 2 the numerals lower than 10 indicate dimensions of the adjacent cell portions produced by the gluing pattern indicated in FIG. 3. Each glue line is proportioned to spread laterally (lengthwise of the strips) to approximately one inch. The relatively straight side walls 44, 45, 46 of the expanded slab not only provide a positive limit to the downward expansion of the slab, thereby preventing the central portion from pulling in to the hourglass shape, but in addition, as shown in FIG. 7, when two fillers as 33 and 34 are used side-by-side, the filler cannot interfit and reduce the filled space, as is possible with prior art constructions, in the manner illustrated at 39 in FIG. 8.

In order to suspend the slab from a panel-type suspension structure such as panel 36 (or from other types of supporting means extending lengthwise of the strips) it has been customary, in the past, as shown in FIG. 9, to glue the support, typified by the panel 36, to the uppermost strip as 38, for the full length of the panel or support, and to glue the second strip 39 to the strip 38 at the ends and at positions corresponding to the tops of the cells 50 and 51 located between second strip 39 and third strip 52, as also shown in FIG. 9. It will be seen that with such prior art constructions it is not possible for any cell opening to occur between panel 36 and the top strip 38 and that little or no cell opening can occur in the region designated 55 between the central portions of the top strip 38 and second strip 39.

In contrast to such prior art constructions, the top strip 38, in accordance with the present invention, serves not only as a part of the suspension means, but also to provide additional cells at the upper end of the slab, and the second strip 39 also opens fully, thereby increasing the overall length of the filler. This effect is achieved by providing, in the suspension means, either in the upper supporting strip 38 or in the panel or top member of the suspension means (36 in FIGS. 2 and 4), portions which can move laterally, that is, lengthwise of the strips, in such manner as to permit the parts of the strip 38 which are not glued to the panel to separate from the panel or upper suspension member, thereby defining additional cells 70,71. This principle is shown in FIG. 4 applied by means of the provision of folded tucks or pleats 62 and 64 in the upper supporting strip 38. The stiff panel 36 is glued to the strip 38 at three positions, designated 57, 58 and 59 in FIG. 2, which correspond to the positions which the vertical rows 60, 61 and 63 of glue positions (FIG. 3) will assume when the unit is fully expanded.

In order to permit the top supporting strip 38 to lie flat against the panel 36, when the filler is collapsed, the folded tucks or pleats or folds, 62 and 64 are preferably provided in the portions of strip 38 which, when the slab is expanded, form the walls 65 and 66. The portions of strip 38 between the glued positions 57, 58, 59 move downwardly when the filler is expanded, straightening the folded portions 62,64 and providing half cells 70,71 between the suspension panel 36 and strip 38. As shown in FIG. 4, a similar fold is provided at 72 and 73 in the walls 74 and 75 of the next subjacent strip 39, to permit outer end portions of strip 38 to be moved inwardly to the outer glued positions 57 and 59 which connect strip 38 to panel 36. Strip 39 also opens fully, providing a full central top cell 55' rather than the narrow unopened space 55 as shown in FIG. 9.

As illustrated in FIG. 5, it is also possible to provide the properly positioned indrawn glued positions 57 and 59 by folding the ends of the subjacent strip portions 74', 75' which correspond to walls 74, 75 in FIG. 2, over the outer ends of top strip 38' which corresponds to strip 38, and gluing it thereto, as indicated at 77 in FIG. 10. It will be seen that the folded portions 62, 64, 72, 73, 62', 64', etc. can be flattened to permit the collapsed units to be compactly stacked and secured together and/or palletized for shipment of the fillers to the point of use.

Corrugated paperboard-type material typically consists of top and bottom sheets as 80, 81 and a wavularly corrugated inner sheet 82 bonded to both (FIG. 6). As indicated above, this material is commonly used in the construction of expansible honeycomb-type fillers because of its high resistance to compression in directions lengthwise of the corrugations in proportion to its weight, and its low cost. One difficulty with such corrugated material has been that it also presents considerable resistance to bending around axes parallel to the corrugations. The hinging action which must occur as the stack is opened to form the expanded filler slab is, with some such materials, so stiff that time and effort are required in order to pull down the suspended stack to its open condition. I have found that it is possible to substantially improve such hinging and openability of fillers formed of such material, without greatly weakening their strength in the protective direction parallel to the corrugations, by partially crushing the corrugations by means of pressure applied to the top and bottom, which may be done after the strips are stacked and glued.

Figure 12:
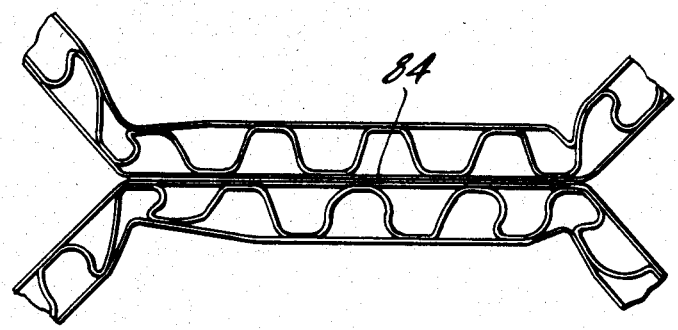
FIG. 12 is a fragmentary enlarged view of a glued position at which two of the strips are connected, illustrating the bent condition of strips at the ends of the glued position, the strips being conventional uncompressed paperboard stock.
Figure 13:
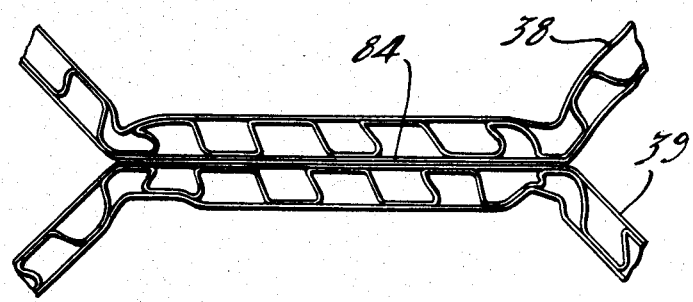
FIG. 13 is a view similar to FIG. 12 but showing the condition in a similar glued area of strips formed of corrugated paperboard stock which has been partially compressed in accordance with the present invention.
Figure 16:
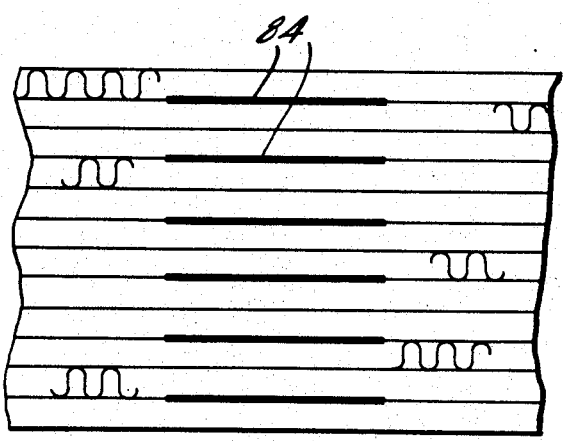
FIG. 16 is a view similar to FIG. 15 showing a glue-treated portion of the stacked strips prior to compression.

In manufacturing the improved fillers glue is applied to the glued positions in a quantity exceeding that which is absorbed by the strips, leaving a layer as 84 of glue, between the strips, and the glue is permitted to harden and bond the strips before the compression is exerted. The glue positions, as brought out in FIGS. 4, 5 and 16 are aligned in vertical rows. Compression is exerted by means of a press sufficiently to partially flatten the corrugations, as shown in FIG. 11. As also brought out in that view, the corrugations which overlie and underlie the layers of hardened glue in the glued areas are distorted more than the remainder of the corrugations. This improves the hinging action which occurs at the ends of the glued positions, without unduly weakening the remaining corrugations. FIG. 13 shows the hinging action of the partially crushed cells as compared with the hinging action of uncompressed corrugations as shown in FIG. 12. By virtue of the improved hinging, when the stacked fillers are suspended in a void area in a cargo transport, the stack tends to fall open to from the fully expanded slab by gravity without requiring the expenditure of time and effort necessary to expand fillers formed with uncrushed corrugated material. The crushing is an inexpensive step. Moreover, since the collapsed and compressed unexpanded fillers are of reduced thickness, there is a substantial saving in the cost of shipping the fillers to the user.

As indicated, some reduction in strength is caused by compressing the stacked strips in the manner described. It is possible to improve the hinging action and ease of opening of the filler by localizing the crushing action so that it occurs only in the glued positions. The partially crushed cells at the extremities of the glued positions then permit the cell walls to hinge in the same manner as if the strips were compressed throughout their full length as in the method previously described.

Figure 14:
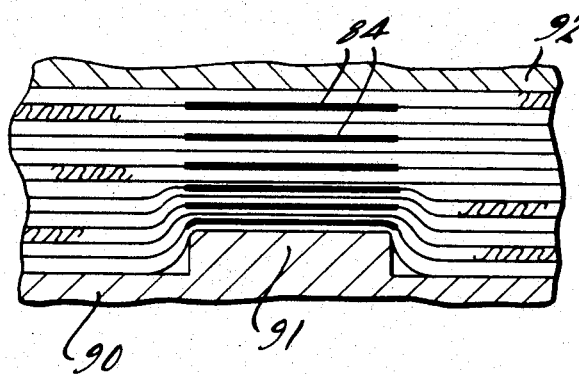
FIG. 14 is a somewhat diagrammatic fragmentary view illustrating a pressing step employed in performing a modified method of compression.
Figure 15:
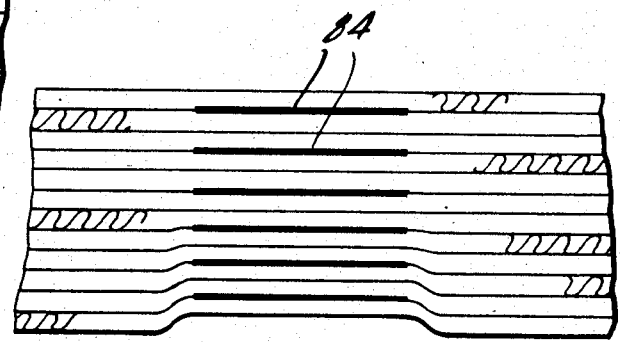
FIG. 15 is a view of strip portions corresponding to those illustrated in FIG. 14, showing the relationship the strips assume after removal from the press.

FIG. 14 shows a portion of the platen 90 of a press having a rib portion 91 on its surface which is positioned in alignment with one of the glued positions. It will of course be understood that one of such ribs, extending the full thickness of the stack, is provided at each glued position. The head 92 of the press is preferably only moved downwardly to an extent which exerts compression in the glued regions only, without compressing the remaining portions of the strips sufficiently to distort the corrugations. Thereafter, when the press is opened, the stack partially reexpands, as shown in FIG. 15, leaving the glued regions partially compressed to improve hinging at their ends.

Figure 17:
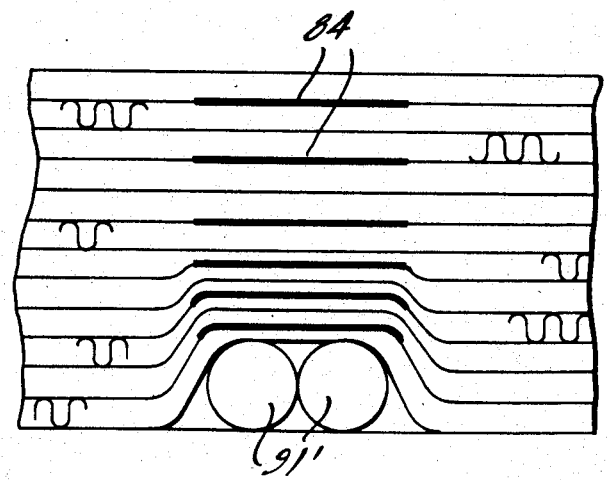
FIG. 17 is a view similar to FIG. 14, showing a somewhat modified compression technique.

FIG. 17 shows a modification in which a similar compression at the glued positions is effected by cylindrical bars 91' which are placed in the press in alignment with the glued positions. By reason of their rounded contour, the bars effectively improve the hinging action, and necessity for modification of the press is eliminated.

FIGS. 18 to 23 inclusive show modified constructions for permitting the opening of partial cells between the top strip of the stack, corresponding to strip 38 previously described, and the uppermost suspension element, corresponding to suspension panel 36, as well as full opening between the top strip and second strip. These views also illustrate the applicability of the invention to honeycomb fillers having different cell configurations.

Figure 18:
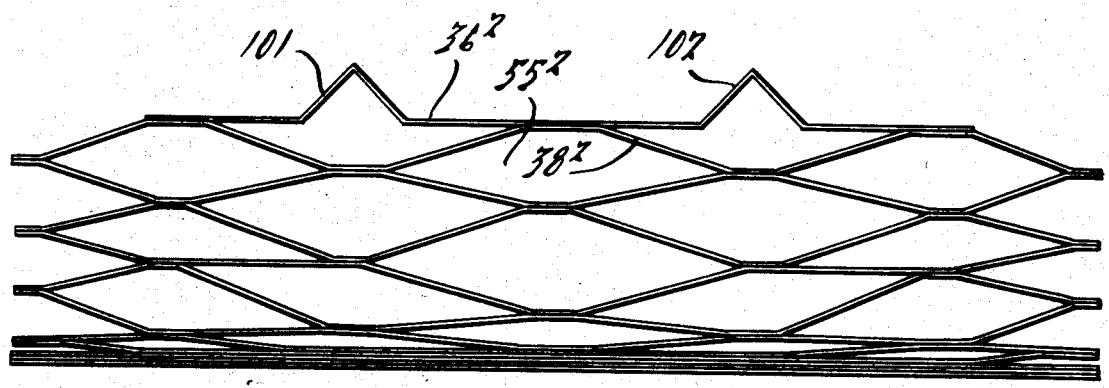
FIG. 18 is a view of the upper portion of a filler unit incorporating a modified form of my improved suspension means, showing the filler partially expanded.

FIG. 18 shows a filler stack of a form similar to the stack shown in FIGS. 1–5 except that the top strip 38 of the stack does not differ from the other strips of the stack, no folds such as parts 62, 64, etc. of FIGS. 1–5 being required in the top strip. The suspension panel $36^2$ is provided with pleat-like folding portions 101, 102 which are substantially flat when the stack is collapsed but which fold upwardly to inverted V-form and become progressively narrower, permitting the outer portions of the panel to move inwardly as the stack is opened, as indicated in FIGS. 18 and 19, thereby permitting the unglued portions of the top strip $38^2$ to move downwardly, to form half-cells $70^2$, $71^2$ between panel $36^2$ and strip $38^2$ and the second strip to open to form cell $55^2$.

Figure 20:
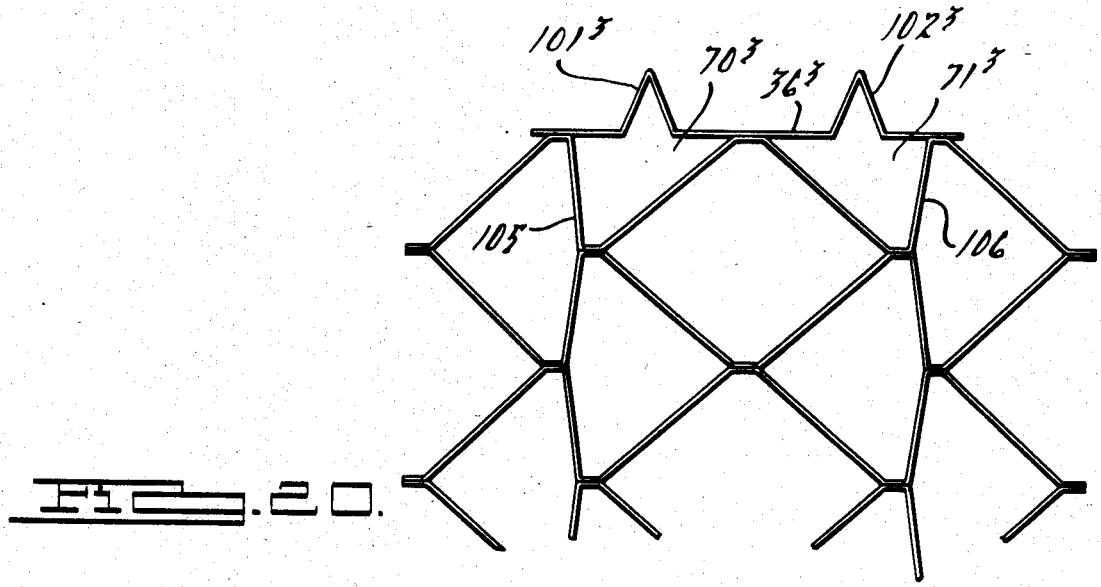

FIG. 20 shows a similar principle applied to a honeycomb structure of a different cell configuration in which shortened extension-limiting walls 105, 106 are positioned inwardly from the sides of the stack. Half cells $70^3$, $71^3$, which are accordingly of a different shape, are permitted to open by pleat-type fold portions $101^3$, $102^2$ which similarly move up and toward closed relation as the stack is opened.

Figure 21:
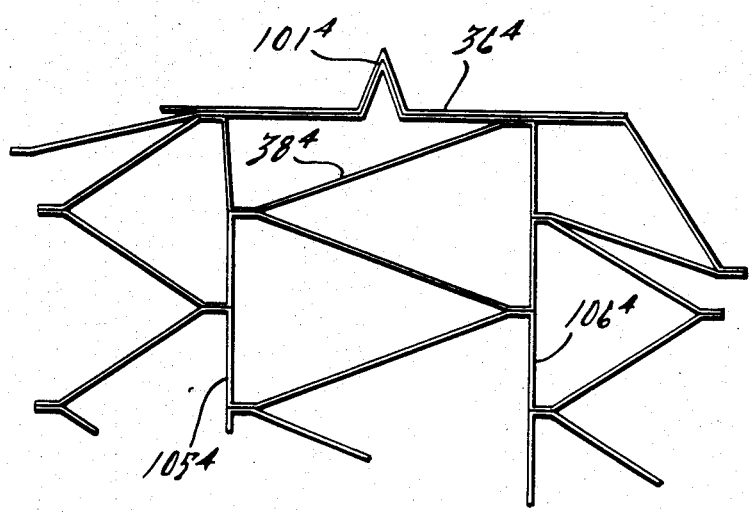

FIG. 21 shows this principle applied to another cell construction wherein the top strip $38^4$ moves away from the suspension panel $36^4$ in the central region only. Provision of the large half-cell $70^4$ requires only a single fold $101^4$. In this construction also, the shortened stretch-limiting walls $105^4$ and $106^4$ are spaced inwardly from the sides of the unit.

Figure 22:
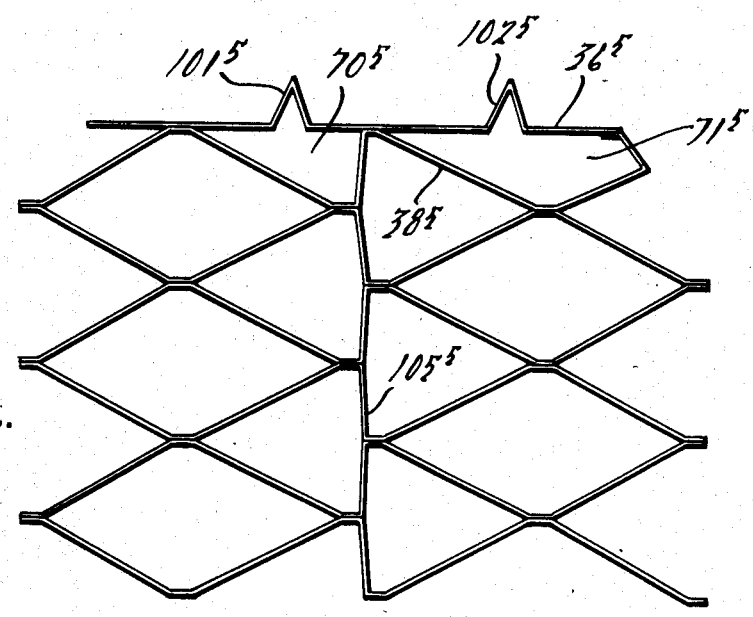

FIG. 22 shows a further modified construction in which only a single centrally located stretch or extension limiting wall is formed by shortened cell walls $105^5$. Partial cells $70^5$, $71^5$ on either side of wall portions $105^5$ at the upper end of the unit, between the top strip $38^5$ and suspension panel $36^5$, are permitted to open as the unit is expanded downwardly by the fold portions $101^5$, $102^5$ which move up and partially close to permit the cells $70^5$, $71^5$ to open.

Figure 23:
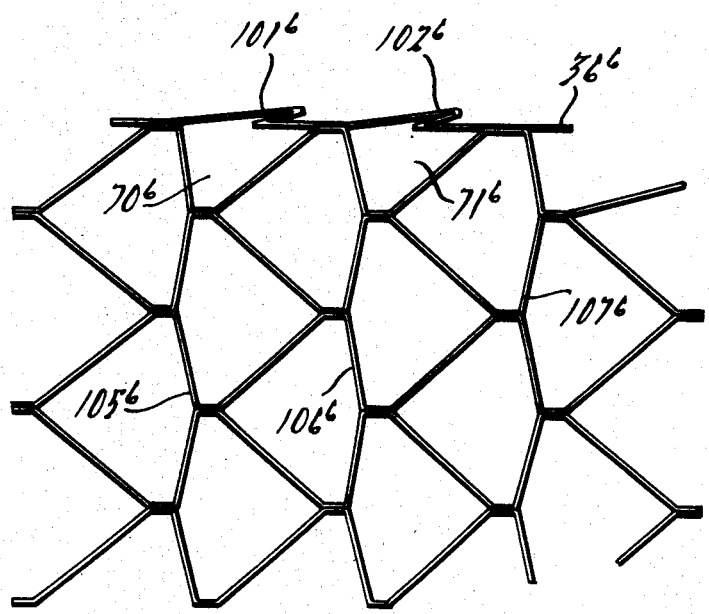

The further construction shown in FIG. 23 incorporates another cell configuration including three rows of shortened extension-limiting cell walls located inwardly from the sides of the unit and designated $105^6$, $106^6$ and $107^6$. It will be appreciated that in the case of all of the fold or pleat portions designated 101 and 102 (and designated similarly with different exponents), the panel material may be scored so that it will readily fold in the manner indicated, as is well known in the art.

Panel $36^6$ in FIG. 23 is shown as provided with somewhat different folding portions. In the area between the partial cells $70^6$, $71^6$ which open as the unit is expanded, panel $36^6$ is scored to provide foldable portions $101^6$, $102^6$ which fold to flat Z-form as the unit is opened.

It is also possible to permit the lateral inward movement of the outer portions of the suspension means necessary to the formation of the partial and expanded top cells without using special folds or other flexible connecting portions. This principle is brought out in FIG. 24. Three separate suspension panels 110, 111, 112 are provided to support the stack, which is shown as having a cell configuration corresponding to that of FIGS. 1–4, 7, 18 and 19. Each of the panels 110, 111 and 112 is glued only to the top of a single one of the full cells at the sides and middle. Thus when the stack opens, the filler slab gains an additionally lengthened effect, analogously to that achieved by the previously described embodiments, by forming what may be referred to as open-topped half cells at the positions designated $70^7$ and $71^7$ in FIG. 24, and a full top center cell $55^7$.

If it is desired to provide a very stiff suspension structure, as may be required with heavier filler units, or where desired by the customer in order to improve the strength and re-usability of the fillers, a stack having foldable portions in the top supporting strip 38, corresponding to those illustrated at 62, 64 in FIGS. 4 and 5, may be secured to a top panel as 115 of corrugated paperboard which is narrower than the stacked strips, and not designed to overlie the cargo in order to support the unit. As shown in FIG. 25, which shows strip 38 and its folds expanded as in use, panel 115 is secured by gluing to the tops of the three full cells, and a wood reinforcing strip 116 is attached to panel 115. Swingable arms 120, 121 are pivotally attached to strip 116 and can be swung to the transverse position shown, to overlie the cargo, but are indrawn and substantially parallel to the strip when the filler is collapsed for storage and shipment. Such swingable supporting arms are disclosed in the prior U.S. Patent to Hees, No. 3,618,535. As is also known in the art, other types of supports and/or suspension means may be used, and may be attached to stiffened members such as 116 to support the filler.

FIG. 26 shows suspension means including wire hangers 124, 125 analogous to the hangers illustrated in Farley U.S. Pat. No. 3,823,675, but attached to divided stiffening strips, 126, 127, which are longitudinally spaced from each other and attached to a top panel 128 to which the subjacent strips are attached. In the area between the spaced strips 126, 127 the panel 128 is provided with a foldable pleat 130 which moves upwardly and toward closed position to permit the panel portions on either side thereof to move toward each other and thereby permit the partial cell area $70^8$ between the panel and the top strip to open.

FIGS. 27 and 29 show another modified suspension arrangement which achieves improved characteristics as to length and also as to cell configuration, without requiring the use of doubled folds or laterally movable suspension parts. Only simple hinging action between the glued and unglued portions is involved during opening and collapsing of the stack, and during installation no special opening or movement of hanger parts is required. Hanger panel member 36 is preferably formed of corrugated stock, as previously described in connection with FIG. 1, and is adapted to overlie spaced cargo to suspend the stack as shown in that view. A top ply 140 is provided which is glued to the full length of the bottom of hanger panel 36 as shown at 141 in FIG. 29. Ply 140 is of the same length as the other plies of the stack, and is centered with respect to panel 36. Each projecting end of ply 140 is glued to the corresponding end of the next subjacent ply 142 at four spaced positions, as shown at 144, 145, 146, 147, FIG. 29. (The thickness of the glue lines is exaggerated in FIGS. 29 and 30 as well as in FIGS. 4, 5, 10 and 14–17.)

As indicated previously, dimensions are given herein merely by way of example and as of possible assistance in understanding and applying the invention. In describing the embodiment of FIGS. 27 and 29 it will be assumed that the strips are, as in the first embodiment, 57 inches in length. Each of the glue lines 144–147, viewed from the end as in FIG. 29, is between $\frac{3}{4}''$ and $1''$ wide and spaced approximately as indicated, the total secured length held by glue lines 144–147 being aplproximately $7\frac{1}{4}$–$7\frac{1}{2}''$. Midway of its length strip 142 is secured to strip 140 by two spaced glue lines 148, 149 which create a secured length of approximately three inches. Strip 142 and the next subjacent strip 143 are secured together at their ends by glue lines 150, 152, to create a secured length of apprximately three inches.

All of the strips below strip 143 are secured together in the same manner as the strips located below the strip 39 in FIGS. 2 and 4, although only four such additional strips (153, 154, 155, 156) are illustrated in FIGS. 27 and 29.

The central glued position of strip 142 defined by glue lines 148, 149 is wider than the other internal glued positions, and the end gluing defined by glue lines 144–147 and 150, 152 is wider than the other end glue lines as 40, thereby shortening the unglued length of strips 142, 143. It will be seen that this straightens the stretch limiting outside walls and controls the configuration of the cells located between the strips 140, 142 and 143, allowing such cells to open fully but preventing any excessive elongation which could tend to cause "hourglassing".

The modification shown in FIGS. 28 and 30 is also adapted to employ a flat hanger panel 36 as shown, and incorporates a special supporting ply 240, initially somewhat longer than the other plies of the stack, glued to the bottom of hanger panel 36 throughout the full length of the latter. In this embodiment, parts corresponding to parts in the embodiment of FIGS. 27, 29 are designated by corresponding reference numerals one hundred integers higher.

At positions so spaced as to correspond to the spacing which exists between the vertical glue rows 61 and 63 when the stack is open, the ply 240 is provided with downwardly looped portions 162, 164 which, when the stack is opened, define flat-bottomed substantially triangular ribs or small cells. The flat bottoms of looped portions 162, 164 are glued to the top of ply 242 at the positions of rows 61 and 63, respectively. The ends and central portions of top ply 240 are glued together with second ply 242 and third ply 243 similarly to the manner in which plies 140, 142 and 143 of the previously described embodiment are glued at the corresponding positions, but portions of ply 242 between its ends and the loops 162, 164 are flattened, as indicated at 245, and no glue lines are provided at positions corresponding to the glue lines 144, 145 in FIG. 29. With this arrangement, the portions of ply 242 between flattened portions 245 and the glued ends held by glue lines 246, 247, 250, 252 slant inwardly away from the stretch limiting outer walls when the stack is open, and the ply 242 coacts with ply 240 to provide a plurality of relatively small upper cell areas which contribute great stiffness to the top of the stack, where loading is normally highest when the filler is in service.

As shown diagrammatically in FIG. 30, when the stack is collapsed, the looped portions 162, 164 are flattened. The material is of course sufficiently crushable so that the extra thickness in rows 61, 63 created by the loops 162, 164 does not prevent the exertion of adequate pressure on the glued areas during manufacture of the stack. In addition, the extra thickness and resultant crushing improves hingability in the manner previously described.

If service requirements are such that the increased strength provided by ply 242 is not required, ply 242 may simply be omitted and loops 162, 164 glued directly to ply 243.

This detailed description of preferred forms of the invention, and the accompanying drawings, have been furnished in compliance with the statutory requirements to set forth the best mode contemplated by the inventor of carrying out the invention. The prior portions consisting of the "Abstract of the Disclosure" and the "Background of the Invention" are furnished without prejudice to comply with administrative requirements of the Patent and Trademark Office.

While preferred forms of the invention have been illustrated and described, it will be recognized that changes may be made within the fair and reasonable scope of the appended claims without departing from the properly patentable scope of the invention.

What is claimed is:

1. An expansible honeycomb-type element comprising a plurality of stacked strips of readily foldable material secured to each other at a plurality of spaced and staggered positions in an initially flat and compact relationship, whereby the stacked strips can be expanded to define a slab having a multiplicity of cells, including a supporting strip defining an end member of said stack, said supporting strip being secured at a plurality of positions to a next subjacent strip, and a suspension structure overlying and secured to said supporting strip at a plurality of positions spaced and offset from the positions at which the supporting strip is secured to said subjacent strip, the portions of said supporting strip between said positions at which it is secured to the suspension structure and to the subjacent strip defining connection suspension walls, characterized by extensible portions forming a part of at least certain of said connecting suspension walls, said extensible portions being extensible longitudinally of the strip, whereby the portions of the supporting strip which are not secured to the suspension structure are expansible away from the suspension structure to define cells between the supporting strip and the suspension structure.

2. A honeycomb-type element as defined in claim 1 wherein when the stack is unexpanded said certain of the walls are longer than the straight line distance between the secured ends thereof and include folded portions which define said extensible portions and which straighten when the stack is expanded.

3. A honeycomb-type element as defined in claim 2 wherein said folded portions are of generally flattened Z-form.

4. A honeycomb-type element as defined in claim 2 wherein the connecting suspension walls comprise end portions of the supporting strip, said end portions extending freely beyond and being hingable with respect to the suspension structure.

5. A honeycomb-type element as defined in claim 4 wherein all of said strips including the supporting strip are of substantially the same length.

6. A honeycomb-type element as defined in claim 4 wherein all of said strips including the supporting strip are of substantially the same length and the end portions of the supporting strip are displaced inwardly toward each other by said folded portions thereof, the end portions of said subjacent strip being folded for connection to the end portions of the supporting strip.

7. A honeycomb-type element as defined in claim 4 wherein the extremities of said end portions of the supporting strip are secured to the extremities of the subjacent strip, including additional folded portions in the end portions of at least one of said two last-mentioned strips, said additional folded portions shortening the initial length of said supporting strip and of the subjacent strip.

8. An expansible honeycomb-type element comprising a plurality of stacked strips of readily foldable material secured to each other at a plurality of spaced and staggered positions in an initially flat and compact relationship, whereby the stacked strips can be expanded to define a slab having a multiplicity of cells, including a supporting strip defining an end member of said stack, said supporting strip being secured at a plurality of positions to a next subjacent strip, and a suspension structure comprising a relatively stiff panel overlying and secured to said supporting strip at a plurality of positions spaced and offset from the positions at which the supporting strip is secured to said subjacent strip, characterized by foldable pleat-like portions of said panel located between the portions of said panel which are secured to said supporting strip whereby the secured portions of said panel and supporting strip are movable with relation to each other in a direction lengthwise of the supporting strip whereby the portions of the supporting strip which are not secured to the suspension structure are expansible away from the suspension structure to define cells therebetween.

9. A honeycomb-type element as defined in claim 8 further characterized by a plurality of suspension elements swingably attached to the panel on opposite sides of said foldable pleat-like portions.

10. An expansible honeycomb-type element comprising a plurality of stacked strips of readily foldable material of corresponding length, said strips being secured together in pairs at their ends in an initially flat and compact relationship, the strips of each pair also being secured together at a plurality of spaced intermediate positions and each strip also being secured to the adjacent strip of an adjacent pair at positions staggered with respect to said previously mentioned positions, whereby the stacked strips can be expanded to form a slab having a multiplicity of cells, the distance between the secured ends of the strips and the secured positions closest thereto being less than the distances between the staggered positions at which the pairs and adjacent pairs are secured together, whereby when the stack is expanded the portions of said strips between the secured ends and the secured positions closest thereto move to a positional relationship more nearly coplanar than do the portions of the strips between the intermediate and staggered positions, to define expansion limiting walls on both side boundaries of the expanded slab.

11. In combination with a honeycomb-type element as defined in claim 10, support means including a hanger member from which the honeycomb-type element is adapted to be supported in depending relation, said support means being characterized by portions integrated with said hanger member and attached to said expansion limiting walls.

12. A combination as defined in claim 11 wherein said portions integrated with the hanger member comprise an additional top strip which corresponds in length to said aforementioned strips of the stack, the hanger member being shorter than the strips, the additional top strip being secured to the hanger member and having end portions projecting beyond the ends of the hanger member and secured to the next subjacent strip.

13. A combination as defined in claim 12 wherein an intermediate portion of said next subjacent strip is secured to said additional top strip for a distance lengthwise of the strips which exceeds the length of the secured portions of the strips at said intermediate positions.

14. In combination with a honeycomb-type element as defined in claim 10, support means including a hanger member which is shorter in length than the strips, characterized by an additional top strip secured to said hanger member and having end portions secured to the uppermost strip of said slab at the positions where said last mentioned strip is secured together with the next subjacent strip in paired relationship.

15. A combination as defined in claim 14 further characterized by looped portions integral with and depending from intermediate portions of said top strip and secured to intermediate portions of said next subjacent strip.

16. A combination as defined in claim 14 further characterized in that said additional top strip is also secured to said expansion limiting walls.

17. An expansible honeycomb-type element comprising a plurality of initially flat stacked strips of corrugated paperboard material, each strip of such material consisting of a top sheet, a bottom sheet, and a corrugated sheet therebetween, the strips being secured to each other by hardened adhesive layers defining bonded areas, each bonded area extending over a plurality of corrugations, said bonded areas being located at a plurality of spaced and staggered positions, whereby the stacked strips can be expanded to define a slab having a multiplicity of cells, characterized in that all of the corrugations of the corrugated sheets, in each of the bonded areas, are partially crushed to a reduced height.

18. The method of forming an expansible honeycomb-type element which comprises bonding together at a plurality of spaced and staggered areas and in an initially flat and compact relationship a plurality of strips of corrugated paperboard, to form a stack, the bonded areas being in aligned rows perpendicular to the strips and the amount of the compressing of the stack being sufficient to compress the corrugations in said bonded areas without substantially compressing the corrugations in other areas, the strips being bonded by applying to the strips at said bonded areas a separate, hardenable adhesive material in a quantity exceeding that which will be absorbed into the strips, and permitting the adhesive to harden before the stack is compressed, and then applying compressive force to the entire stack, whereby the corrugations are crushed to a desired extent in the bonded areas without unwanted crushing of the corrugations in other areas.

19. An expansible honeycomb-type element comprising a plurality of stacked strips of readily foldable material of corresponding length, said strips being secured together in pairs at their ends in an initially flat and compact relationship, the strips of each pair also being secured together at a plurality of spaced intermediate positions and each strip also being secured to the adjacent strip of an adjacent pair at positions staggered with respect to said previously mentioned positions, whereby the stacked strips can be expanded to form a slab having a multiplicity of cells, suspension means connected to an upper strip of the stack for supporting the expanded slab from the suspension means in depending relation thereto, and adhesive connections defining said secured positions, characterized in that in an upper portion of the slab the adhesive connections are wider, in a direction lengthwise of the strips, than in a lower portion of the slab.

20. An expansible honeycomb-type void filler formed of stacked strips secured together at spaced and staggered positions to define cell walls when the filler is expanded, suspension means for supporting the filler in expanded condition, said suspension means consisting of a supporting end strip and suspension structural portions secured to said end strip at spaced positions, characterized by pleated hingable portions incorporated in said suspension means permitting relative movement of parts of said suspension means toward and from one another, in a direction lengthwise of the strips, as the filler is expanded and recompressed, to permit opening and closing of cell portions between the suspension structural portions and the supporting end strip.

21. An expansible honey-comb type element as defined in claim 12 wherein the strips are pursable as the stack is expanded, including a supporting strip defining an end member of said stack, said supporting strip being bonded at a plurality of areas located at end and intermediate positions to a next subjacent strip, and a suspension structure overlying and bonded to said supporting strip at a plurality of areas spaced and offset from positions at which the supporting strip is bonded to said subjacent strip, said suspension structure including a relatively rigid central portion which is shorter than the unpursed length of said strips, and extension arm portions at each end of and hingedly connected to said central portion, further characterized in that said extension arm portions are bonded to end portions of the supporting strip in elongated bonded areas which are longer in directions lengthwise of the strips than the areas in which the supporting strip is bonded to the subjacent strip, whereby when the stack is expanded the elongated bonded areas move inwardly to form a part of said expansion limiting walls and cause cells to open between the central portion and the supporting strip and between the supporting strip and subjacent strip.

* * * * *

UNITED STATES PATENT AND TRADEMARK OFFICE
CERTIFICATE OF CORRECTION

PATENT NO. : 4,585,381

DATED : April 29, 1986

INVENTOR(S) : George C. Boyse

It is certified that error appears in the above-identified patent and that said Letters Patent is hereby corrected as shown below:

Column 4, line 34, "filler" should be --fillers--.

Column 6, line 6, "from" should be --form--.

Column 12, line 63, (Claim 21), "12" should be --10--.

Signed and Sealed this

Twenty-third Day of September 1986

[SEAL]

Attest:

DONALD J. QUIGG

Attesting Officer

Commissioner of Patents and Trademarks